2,402,108

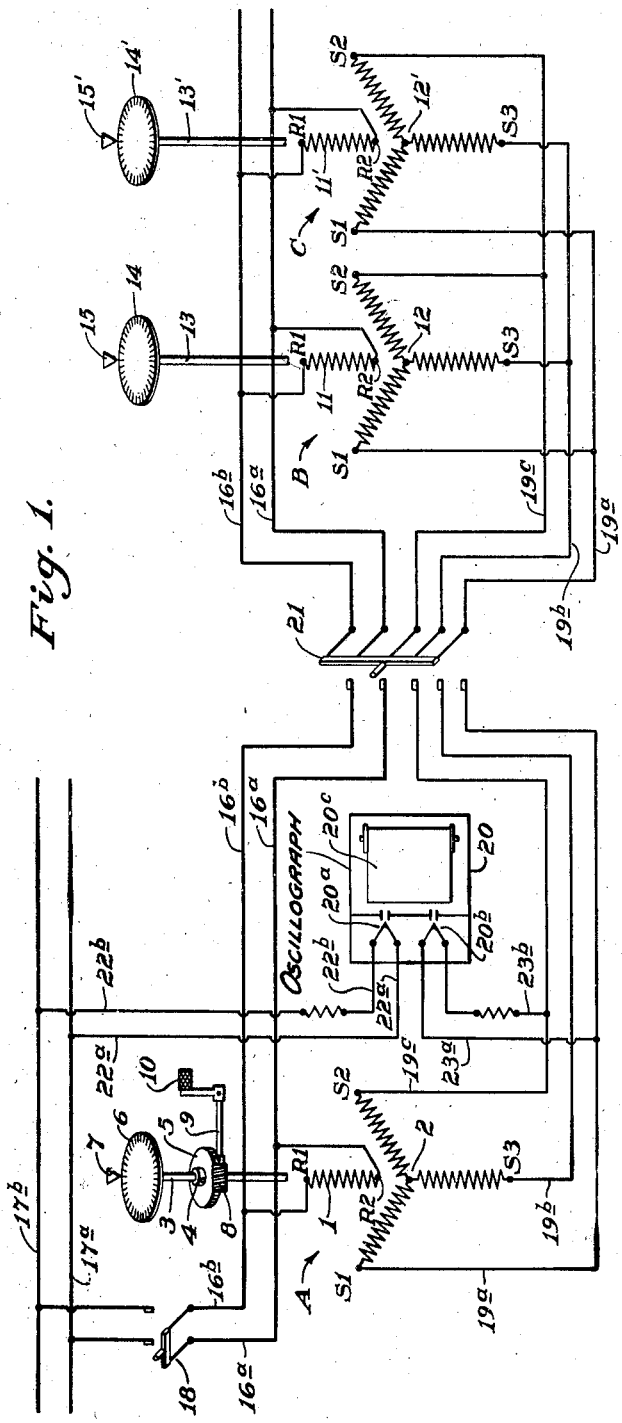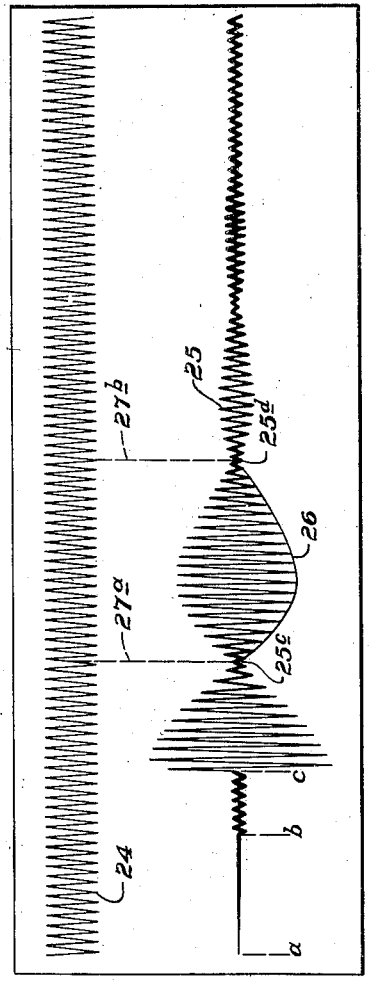
June 11, 1946. W. W. WILLARD 2,402,108
APPARATUS AND METHOD FOR TESTING SELF-SYNCHRONOUS TRANSMISSION SYSTEMS
Filed April 20, 1934
INVENTOR
*Waldo W. Willard*
BY
*Walter J. Gill*
ATTORNEY Patented June 11, 1946

UNITED STATES PATENT OFFICE 2,402,108

APPARATUS AND METHOD FOR TESTING SELF - SYNCHRONOUS TRANSMISSION SYSTEMS

Waldo W. Willard, Schenectady, N. Y., assignor to Ford Instrument Company, Inc., Long Island City, N. Y., a corporation of New York Application April 20, 1934, Serial No. 721,536

8 Claims. (Cl. 177—337)

Self-synchronous systems are commonly employed for the purpose of transmitting angular motion accurately from one point to another, one such application being for transmitting data between different stations in connection with ordnance fire control apparatus. These self-synchronous systems include a transmitter or generator and one or more receivers or motors. Each generator and motor comprises a stator and a rotor and the rotors of the motors of the system synchronize in movement with the movements of the generator. When such systems contain a plurality of motors, each motor exerts an influence upon the other motors, similar to the influence of the generator, when the motors are asynchronous.

In order that a self-synchronous system function properly for its intended purpose, there must be reliable, accurate and immediate response of the motors of the system to the movements of the controlling generator. The reliability, accuracy and rapidity of response of the motors of the system to movement of the generator depend upon the unbalanced torque developed in the motors by movement of the generator, that is, the torque over and above that required to overcome the inertia of the rotors of the motors which unbalanced torque is a measure of the rigidity or, as it is commonly called, the "stiffness of coupling" of the system.

By this invention, the stiffness of coupling of a system may be readily compared with other systems or a selected standard. In accordance with the invention a system to be tested is energized while the generator and motors are relatively offset from their synchronous relation and a period, or a portion thereof, of the damping oscillations of the motors in returning to their synchronous position with respect to the generator is measured. Since the period of oscillation varies inversely as the torque developed in the motor and directly as the inertia, the periods of the damping oscillations in a motor with a high unbalanced torque are short due to the rapidity of movement of the rotor in response to the high unbalanced torque acting to bring the rotors of the motors into synchronized position; and conversely, a low unbalanced torque developed in the rotors of the motors results in long periods in the damping oscillations. The measured period of the damping oscillations, therefore, provides an accurate measure for comparing the stiffness of coupling of the system with similar systems or a selected standard.

In the form in which the invention is now practiced, a coefficient of stiffness of coupling is employed for comparing the stiffness of coupling of various systems. This coefficient of stiffness of coupling is arbitrarily taken as the square of the reciprocal of the first complete half period of the damping oscillations of the motors of the system after the first passage of the motors through the position of synchronism as determined in accordance with the invention. By this expedient, the greater the time required for the rotors of the motors to complete the selected portion of the damping oscillations, the smaller will be the coefficient of stiffness. Experience has shown that for a satisfactory system having a single motor, the coefficient of stiffness of coupling as thus determined should be high (for example above 100), and it decreases in accordance with the number of motors in the system.

The portion of the period of oscillation from which the coefficient of stiffness is calculated may be determined by connecting into the system an oscillograph having two vibrators. One of the vibrators of the oscillograph is connected across the supply lines through which normally passes an alternating current of known uniform frequency, commonly sixty cycles a second. The other vibrator is connected across the lines of the system of which the voltage is zero when the system is at rest in synchronism. The generator is provided with a crank for rotating its rotor manually and a dial to indicate the amount of rotation. With the units of the system in synchronism, the system is energized and the rotor of the generator is moved through a predetermined angle. The angular movement imparted to the rotor of the generator is accompanied by a corresponding movement of the motor rotors. The system is then deenergized and the rotor of the generator is returned to its original position and held in this position against rotation. The system is then again energized and the motors permitted to oscillate about their synchronized position with respect to the generator.

The constant frequency voltage and the damping oscillations of the motors are recorded side by side on the oscillogram and a period of the damping oscillations or any portion thereof can be determined by comparison with the record on the oscillogram of the voltage of known frequency. As stated above, the time for the motors to complete one-half cycle or damping oscillation is determined and the reciprocal of the square of this time is expressed as the coefficient of stiffness of the system.

One arrangement for determining the coefficient of stiffness in this manner is illustrated in the accompanying drawing in which:

Fig. 1 is a diagrammatic illustration of a synchronous transmission system arranged for testing; and Fig. 2 is a reproduction of an oscillograph record and illustrates the manner in which the time required for the motors of a system to complete a predetermined portion of an oscillation is ascertained.

The system illustrated in Fig. 1 includes a generator A and two motors B and C. As illustrated the generator includes a rotor 1 and a stator 2. The rotor 1 has two terminals designated R1 and R2 and the stator which has a star winding has three terminals designated S1, S2 and S3 in accordance with the usual conventional designation. A shaft 3 extends from and is connected to the rotor 1 for rotation therewith. Secured to the shaft 3 through a hub 4 there is a worm gear 5 and a marked dial 6 which may be read against a fixed index 7. The gear 5 meshes with a worm 8 which is secured on a shaft 9 that carries a crank 10 by means of which the rotor of the generator may be manually displaced.

The motors illustrated are identical, the motor B includes a rotor 11 having terminals R1 and R2 and a star wound stator 12 having terminals S1, S2 and S3. A shaft 13 carrying a dial 14 readable against a fixed index 15 is secured to the rotor for rotation therewith. The parts of the motor C corresponding to the parts of the motor B are designated with the same characters primed.

The rotors of the generator and motors are excited by an alternating current of constant frequency and are connected across line wires 16a and 16b which are connected to supply lines 17a and 17b through a double pole switch 18. The terminals of the generator stator are connected in parallel with the similarly designated terminals of the stators of the motors by conductors 19a, 19b and 19c.

For the purpose of securing the necessary data to determine the coefficient of stiffness of the system an oscillograph 20 having two vibrators 20a and 20b is connected into the system; and in order to secure a check on the position of the generator rotor at the time an oscillogram is made, a five pole single throw switch 21 is inserted between the motor and the generator for opening the conductors 16a, 16b, 19a, 19b and 19c and thus disconnecting the rotors of the motors from the excitation supply and disconnecting the stators of the motors from the generator stator. The vibrator 20a of the oscillograph is connected by conductors 22a and 22b across the supply wires 17a and 17b and is therefore actuated by a current of uniform amplitude and frequency, usually 60 cycles. The vibrator 20b is connected by conductors 23a and 23b across the conductors 19a and 19c between which there is no difference of potential when the generator and motors are at rest in synchronism. The movements of the vibrators 20a and 20b are recorded on a moving film 20c in the oscillograph in the usual way.

In obtaining an oscillogram from which the coefficient of stiffness of the system may be derived, the generator and motors are first set on electrical zero which may be determined in accordance with the teaching of Patent No. 1,554,915 granted September 22, 1925. The switches 18 and 21 are then closed and the rotor of the generator is rotated manually through an angle, commonly an angle of 36°, as indicated by the dial 6. The rotors of the motors follow the movement of the generator and they are therefore displaced through the same angular distance. After the generator and motors have been thus angularly displaced, the switches 18 and 21 are opened and the generator is returned manually to its original position, the motors remaining in their displaced positions. The worm and worm gear connection between the shafts 4 and 9 prevent the generator rotor from displacement by the torque developed in the rotor. With the generator rotor at zero and the motor rotors displaced, the switch 18 is closed, and after a suitable interval of time, usually less than one second, the switch 21 is closed and the rotors of the motors are permitted to oscillate about their synchronized position.

A typical oscillogram which results from the above described course of procedure is reproduced in Fig. 2 of the drawing. The vibrator 20a produces on the film 20c a curve 24 of uniform amplitude and frequency. Before the switch 18 is closed with the generator approximately on electrical zero, a straight line is drawn on the film 20c by the vibrator 20b as indicated by the portion a—b of the curve 25. When the switch 18 is closed, the vibrator 20b is usually actuated slightly due to the fact that the mechanical arrangement is not such that it is possible to place the generator accurately at electrical zero. The portion b—c of the curve 25 is the result of this slight vibration and constitutes a graphic indication of the position of the generator when the switch 21 was closed. Upon closing the switch 21, the varying difference of potential across the conductors 19a and 19c due to the displacement of the motor rotors is recorded. This difference of potential becomes zero when the rotors of the motors pass through their synchronized position as indicated at points 25c and 25d, and the envelope 26 of the curve between these points represents the first half cycle or period of oscillation of the rotors of the motors after their first passage through the position of synchronism.

As heretofore stated, the time required for the rotors to complete this portion of their oscillations is taken as a basis from which the coefficient of stiffness of coupling of the system may be calculated. This time may be accurately determined from the curves illustrated in Fig. 2 by drawing lines as indicated by 27a and 27b between the points 25c and the curve 25d and the points of the curve 24 directly opposite these points. From the known frequency of the supply current, the elapsed time between the points 25c and 25d can be readily determined by counting the number of cycles of the curve 24 between the lines 27.

Representing the elapsed time by $t$, the coefficient of stiffness of coupling is represented by $1/t^2$. By way of illustration, let it be assumed that the time required by the rotors of the motors to complete their first half cycle of oscillation, after first passing the position of synchronism, has been determined to be one-tenth of a second, the coefficient of stiffness of coupling will then be 100 which is a convenient way of expressing the coefficient since it affords a numerical value roughly proportional to the merit of the particular system tested.

In practicing the method of testing explained herein, variations of either voltage or frequency from their normal values will affect the results, so that the values of these factors should be kept as constant as possible during the tests. If, however, the voltage and/or frequency vary from normal values, corrections should be applied to the resulting values of $t$ to compensate for such changes in accordance with the following equation which is used because of the low power factor of the systems:

$$t=T\left(\frac{v'}{v}\right)\times\left(\frac{f}{f'}\right)$$

in which
T is the actual time of the specified first half period of oscillation;
$f$ normal frequency;
$f'$ the frequency used in the test;
$v$ the normal voltage;
$v'$ the voltage used in the test.

Under these conditions the coefficient of stiffness of coupling is represented by the equation $$\frac{1}{t^2}=\frac{1}{T^2}\left(\frac{v}{v'}\right)^2\times\left(\frac{f'}{f}\right)^2$$

It will be obvious that various changes may be made by those skilled in the art in the system utilized in conducting the test and the steps performed within the principle and scope of the invention as expressed in the appended claims.

I claim:

1. In an electrical self-synchronous transmission system including a generator having a rotor and a stator, a motor having a rotor and a stator, conductors connecting the rotors of the generator and the motor to a source of alternating current of constant frequency, other conductors connecting the stators of the generator and the motor, switches in said conductors, means for displacing the rotor of the generator through a predetermined amount with the switches closed to cause a corresponding displacement of the rotor of the motor and for restoring the rotor of the generator to its original position with the switches open, said displacing means being irreversible to hold the rotor of the generator in its restored position, an oscillograph having two vibrators, means for connecting one of the vibrators to the source of alternating current and means for connecting the other vibrator to the conductors connecting the stator of the generator and the motor and between which there is no difference of potential when the generator and the motor are energized but at rest in synchronism.

2. In an electrical self-synchronous transmission system including a generator having a rotor and a stator, a motor having a rotor and a stator, conductors connecting the rotors of the generator and the motor to a source of alternating current of constant frequency, other conductors connecting the stators of the generator and the motor, switches in said conductors, means for producing relative displacement between the rotors of the generator and the motor out of their normal synchronous relation to each other, said means including irreversible mechanism for holding the rotor of the generator in fixed position, an oscillograph having two vibrators, means for connecting one of the vibrators to the source of alternating current and means for connecting the other vibrator to the conductors connecting the stator of the generator and the motor and between which there is no difference of potential when the generator and the motor are energized but at rest in synchronism.

3. The method for determining the relative stiffness of coupling of an electrical, self-synchronous, motion transmitting system, which method includes producing relative displacement between the rotors of the generator and the motor out of their normal synchronous relation to each other, securing the rotor of the generator against displacement, energizing the system to cause the rotor of the motor to assume its normal synchronous relation to the rotor of the generator and simultaneously recording a voltage wave representing a constant amplitude and frequency and a voltage wave representing the variations in voltage in the conductors between the stators of the generator and the motor.

4. The method for determining the relative stiffness of coupling of an electrical, self-synchronous, motion-transmitting system, which method includes energizing the system, displacing the rotor of the generator through a predetermined amount to cause corresponding displacement of the rotor of the motor, deenergizing the system, restoring the rotor of the generator to its original position and securing it in its restored position, energizing the system to cause the rotor of the motor to return to synchronous relation with respect to the rotor of the generator, and simultaneously recording a voltage wave representing a constant amplitude and frequency and a voltage wave representing the variations in voltage in the conductors between the stators of the generator and the motor.

5. The method of determining the relative stiffness of coupling of an electrical, self-synchronous, angular motion transmitting system, comprising the steps of normally operating the system to a known angular extent, returning the rotor of the generator to its initial position while maintaining the rotor of the motor in the position to which it has been moved by said operation, causing the energy in the system to move the rotor of the motor to overcome the asynchronism thereof with the rotor of the generator while maintaining the rotor of the generator stationary, and simultaneously with the last mentioned movement of the rotor of the motor recording a voltage wave representing a constant amplitude and frequency and a voltage wave representing the voltage variations in the conductors between the stators of the generator and the motor.

6. The method of determining the relative stiffness of coupling of an electrical, self-synchronous, motion transmitting system, comprising the steps of effecting a known degree of asynchronism between the rotor of the generator and the rotor of the motor, maintaining the rotor of the generator stationary while causing energy in the system to act upon the rotor of the motor to overcome said asynchronism, and simultaneously with the last mentioned step recording a voltage wave representing a constant amplitude and frequency and a voltage wave representing the voltage variations in the conductors between the stators of the generator and the motor.

7. The method of determining the relative stiffness of coupling of an electrical, self-synchronous, motion transmitting system, comprising the steps of applying energy in the system to move the rotor of the motor to overcome a known degree of asynchronism between the said rotor and the rotor of the generator while maintaining the last mentioned rotor stationary, and simultaneously with the said movement of the rotor of the motor recording a voltage wave representing a constant amplitude and frequency and a voltage wave representing the voltage variations in the conductors connecting the stators of the generator and the motor.

8. The method of determining the relative stiffness of coupling of an electrical, self-synchronous, motion transmitting system, comprising the steps of applying energy in the system to move the rotor of the motor to overcome a known degree of asynchronism between the said rotor and the rotor of the generator while maintaining the last mentioned rotor stationary, and simultaneously with the said movement of the rotor of the motor recording a reference voltage wave and a voltage wave representing the oscillations of the rotor of the motor about its position of synchronism with the rotor of the generator.

WALDO W. WILLARD.